United States Patent [19]

Ohkawa et al.

[11] 4,305,783
[45] Dec. 15, 1981

[54] TOKAMAK WITH LIQUID METAL TOROIDAL FIELD COIL

[75] Inventors: Tihiro Ohkawa, La Jolla; Michael J. Schaffer, San Diego, both of Calif.

[73] Assignee: The United States of America as represented by the United States Department of Energy, Washington, D.C.

[21] Appl. No.: 15,962

[22] Filed: Feb. 28, 1979

[51] Int. Cl.³ .............................................. G21B 1/00
[52] U.S. Cl. .................................. 376/133; 376/142; 376/144
[58] Field of Search .............................. 176/1, 3, 6–9

[56] References Cited

U.S. PATENT DOCUMENTS 3,037,921 6/1962 Tuck ........................................ 176/3
3,708,391 1/1973 Christofilos ............................ 176/7
4,000,036 12/1976 Ensley ...................................... 176/3

FOREIGN PATENT DOCUMENTS 855859 12/1960 United Kingdom ..................... 176/9

OTHER PUBLICATIONS

ORNL-TM 3096, 5/73, Fraas, pp. 1, 10-30.
Proc. of the High Beta Workshop, 1975, Robson et al., pp. 60-70.

Primary Examiner—Harvey E. Behrend

[57] ABSTRACT

Tokamak apparatus includes a pressure vessel for defining a reservoir and confining liquid therein. A toroidal liner disposed within the pressure vessel defines a toroidal space within the liner. Liquid metal fills the reservoir outside said liner. Electric current is passed through the liquid metal over a conductive path linking the toroidal space to produce a toroidal magnetic field within the toroidal space about the major axis thereof. Toroidal plasma is developed within the toroidal space about the major axis thereof.

7 Claims, 7 Drawing Figures

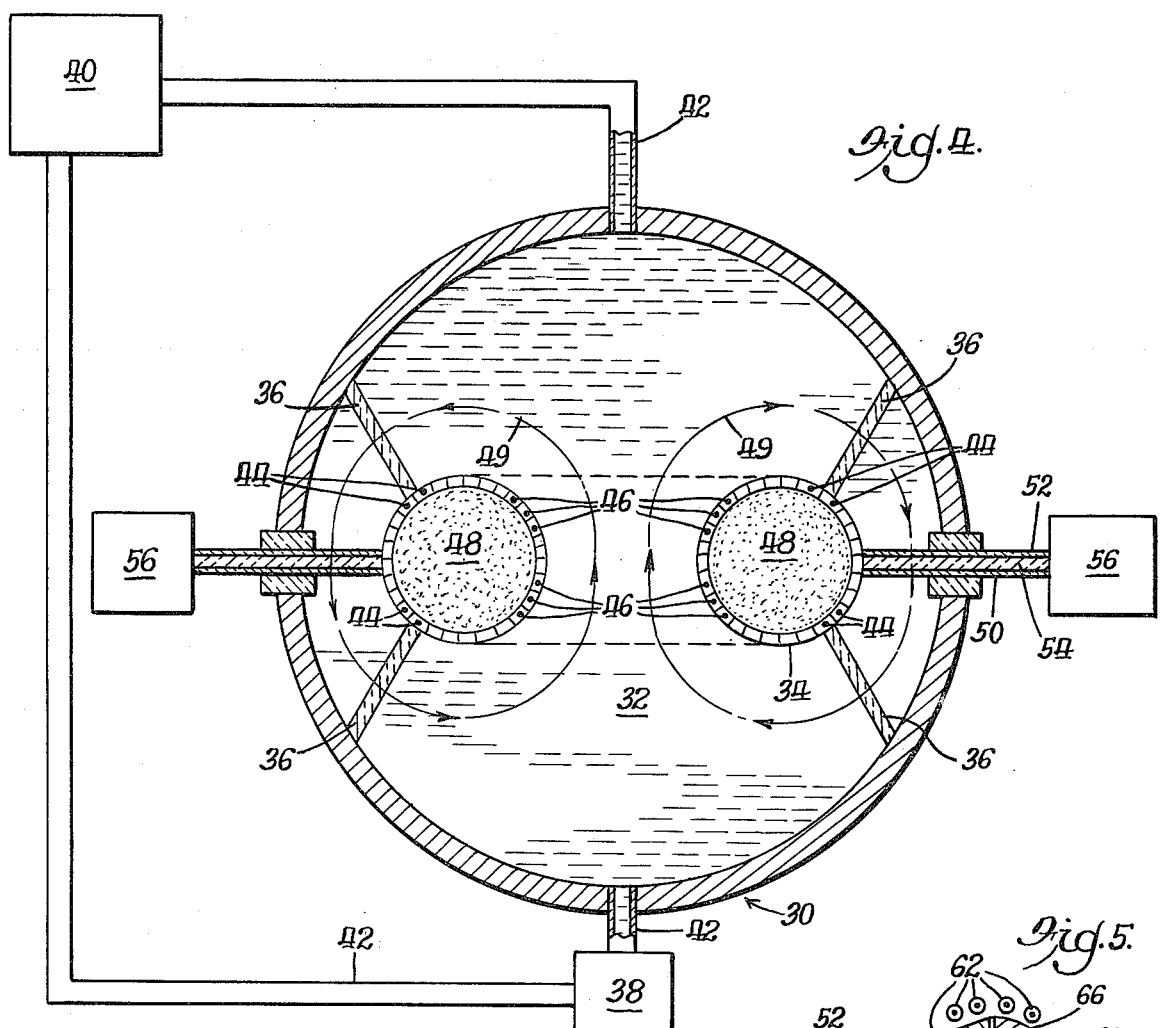
Fig. 4.
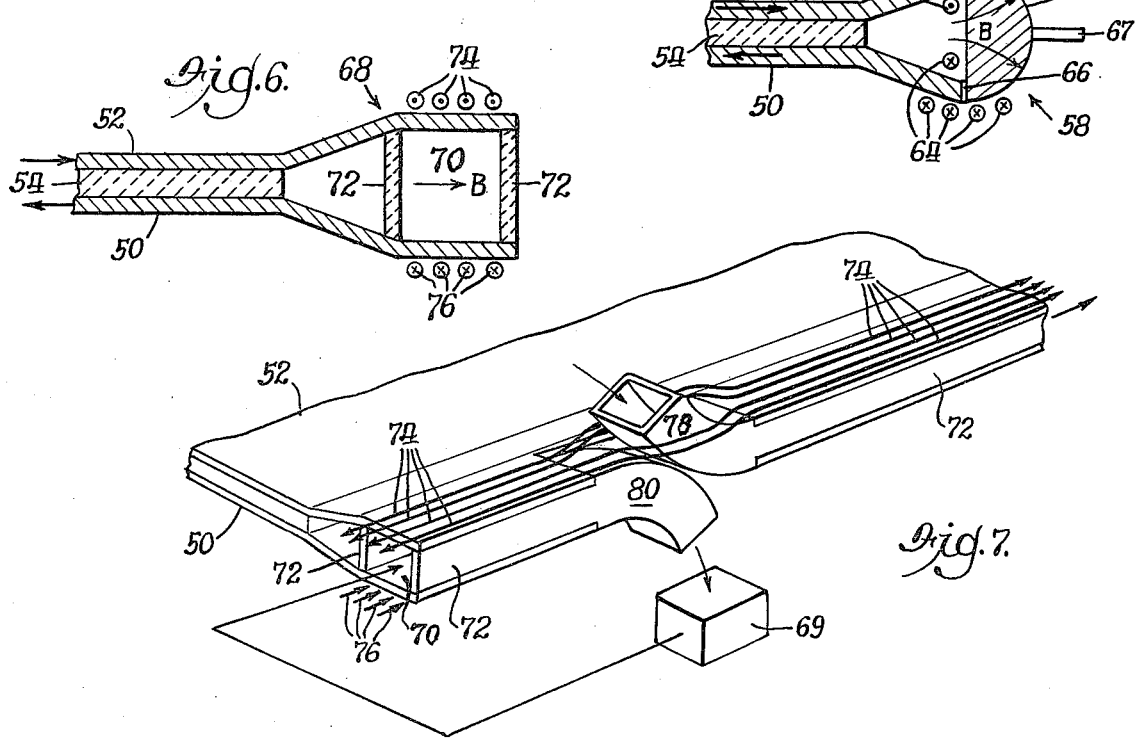
Fig. 5.
Fig. 6.
Fig. 7.

TOKAMAK WITH LIQUID METAL TOROIDAL FIELD COIL

This invention relates generally to plasma devices, particularly such devices of the tokamak type. More particularly, the present invention relates to the generation of toroidal magnetic fields in such devices utilizing liquid metal to form coils for generating toroidal magnetic fields.

Tokamak devices are devices in which plasma is created in a toroidal space and is confined therein by an appropriate combination of toroidal and poloidal magnetic fields. Such devices are useful in the study and analysis of plasmas, and particularly in the generation, confinement, study and analysis of hydrogenic plasmas. Such devices are among the most useful of known plasma devices for the reaction of deuterium and tritium with the production of high energy neutrons as reaction products. The present invention finds particular utility in respect to such devices and their applications, including experimental devices and the use thereof in experimentation and investigation in respect to toroidal plasma devices of the tokamak type.

In tokamak devices, gases are disposed in a toroidal confinement vessel. The gases are ionized to produce a plasma that is heated and confined by appropriate magnetic and electrical fields. The principal field is a toroidal magnetic field conventionally created by electrical coils linking the torus. A serious difficulty with such coils, particularly where high fields are created in a small space, has been occasioned by the very great mechanical forces and stresses created in the coils and their supports. In accordance with the present invention, the toroidal field coil is formed of a single turn of liquid metal, whereby the fluid nature of the metal relieves all internal stresses; a pressure vessel contains the liquid metal and isolates the metal mechanically from the outside environment.

Thus, a primary object of the present invention is to provide a tokamak apparatus including a reservoir of liquid metal through which electrical current is passed to generate a toroidal magnetic field through toroidal plasma. Other objects and advantages of the invention will become apparent from the following detailed description, particularly when taken in conjunction with the accompanying drawings in which:

FIG. 4 is an illustration, partly diagrammatic and partly in axial section, of a tokamak device utilizing the present invention for producing the toroidal magnetic field;

FIG. 5 is an illustration in transverse section of a preferred form of power supply for producing the toroidal magnetic field in the device illustrated in FIG. 4;

FIG. 6 is an illustration in transverse section of an alternative form of power supply for producing the toroidal magnetic field in the device illustrated in FIG. 4; and FIG. 7 is a view, partly in elevation and partly diagrammatic, of the power supply shown in FIG. 6.

One of the more difficult aspects of high temperature plasma devices is the confinement of the plasma, which is ionized gas. This can be accomplished by the now well-known tokamak device. It has a toroidal containment vessel for containing the gas and the plasma. Twisting magnetic fields are created within the toroidal vessel to confine the plasma and keep it from striking the walls of the toroidal vessel. These fields include toroidal and poloidal components as produced by the flow of electric current. The manner of creating such fields is illustrated conceptually in FIGS. 1 and 2, and a generalized and simplified form of tokamak device is illustrated in FIG. 3.

Figure 1:
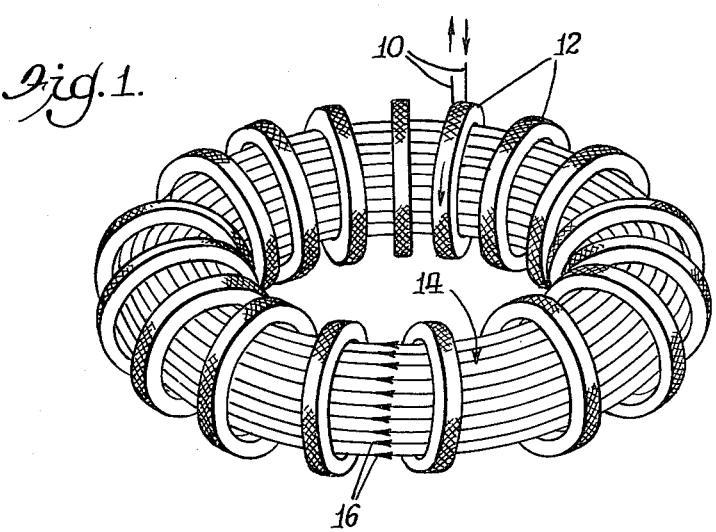
FIG. 1 is a stylized illustration of the manner of producing a toroidal magnetic field in a tokamak device.

In FIG. 1 is illustrated the means for producing the toroidal magnetic field component. Electrical current is applied over conductors 10 to toroidal field coils 12. The current in these coils links a toroidal space 14 and hence generates a toroidal magnetic field 16 therein, as indicated by the arrows.

Figure 2:
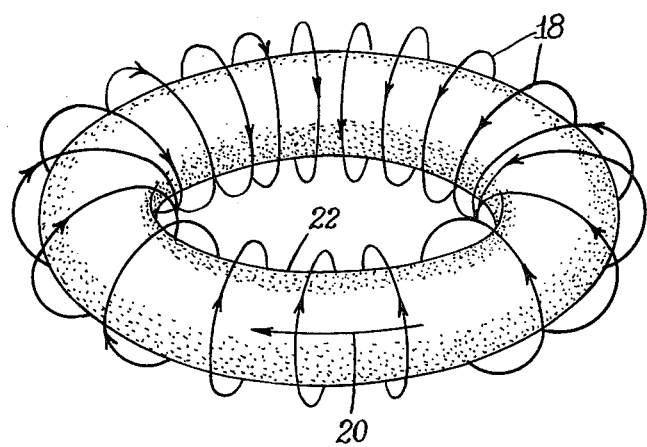
FIG. 2 is a stylized illustration of the manner of producing a poloidal magnetic field in a tokamak device.

In FIG. 2 is illustrated the means for producing the principal poloidal magnetic field component that is necessary for stable confinement. In this device, the poloidal field 18, as indicated by the arrows, is induced by toroidal current 20 in the plasma 22. In practice electric current in equilibrium field coils outside to torus generates an additional poloidal magnetic field which modifies the principal poloidal field to control the position of the plasma.

Figure 3:
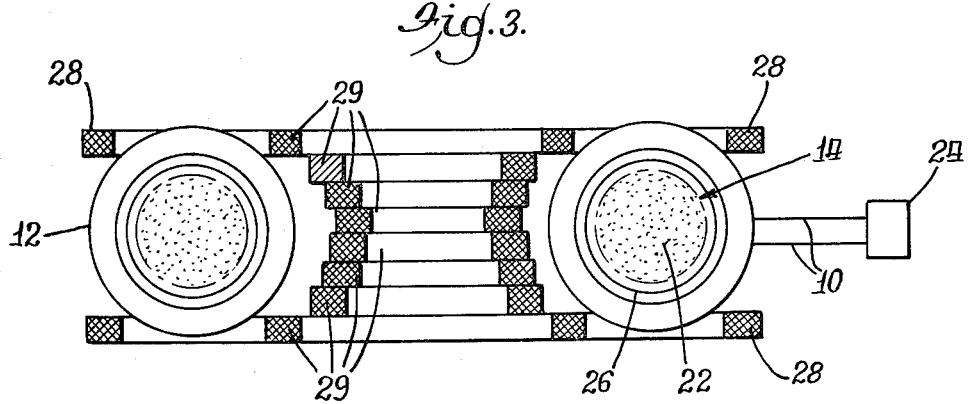
FIG. 3 is a stylized illustration of a conventional tokamak device.

As generalized, a conventional tokamak device, as illustrated in FIG. 3, combines the features of FIGS. 1 and 2 to provide a high level of plasma stability. As there illustrated, current from a power source 24 is applied over the conductors 10 to the toroidal field coils 12 which are disposed around a toroidal liner 26 which contains and defines the toroidal space 14 in which the plasma 22 is created. Equilibrium field coils 28 are supplied with electrical current from a source not illustrated to position the plasma 22 within the liner 26. Ohmic heating coils 29, also supplied with electrical current from a source not illustrated, induce current in the plasma 22 to ionize the gas, heat the plasma, and generate the poloidal magnetic field illustrated in FIG. 2.

In FIG. 4 is illustrated a preferred form of the invention for producing the toroidal magnetic field. It is thus a form of the device shown in stylized form in FIG. 1. In this preferred embodiment of the present invention, a pressure vessel 30 forms a reservoir filled with liquid metal 32. A toroidal liner 34 is supported within the liquid metal 32 by struts 36 extending to the vessel 30. The pressure vessel 30 is formed of material, such as stainless steel, capable of withstanding relatively high internal pressure while not being attacked by the environment, notably the liquid metal 32. While various other metals are effective for certain purposes, liquid lithium is preferred for the liquid metal 32, particularly for deuterium-tritium plasma devices, for lithium is suitable for moderating resultant neutrons and acts to breed tritium fuel by reaction with the neutrons:

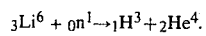

$$_3Li^6 + {_0}n^1 \rightarrow {_1}H^3 + {_2}He^4.$$

The liquid metal also acts as a coolant, being circulated by a pump 38 through a heat exchanger 40 by way of conduits 42. The toroidal liner 34 is preferably formed of electrically insulating material and may have equilibrium field coils 44 and ohmic heating coils 46 embedded therein to provide an appropriate poloidal magnetic field and appropriate ohmic heating in the usual fashion.

Alternatively, these coils 44 and 46 may be supported in the liquid metal 32.

The toroidal liner 34 defines a toroidal space 48 in which gas is confined for producing plasma. The liner 34 separates the liquid metal 32 from the toroidal space 48 and thus forms a bubble of gas in a pool of liquid. The ohmic heating coils 46 are energized in a conventional manner to ionize the gas and produce the plasma. The plasma is positioned by the action of the poloidal equilibrium magnetic field and is stabilized by a toroidal field produced by current passed through the liquid metal over a conductive path 49 linking the toroidal space 48. Such current is passed through the liquid metal 32 between conductive feed plates 50 and 52, the feed plates 50 and 52 having an insulator 54 interposed therebetween to cause the current flow to link the space 48.

Current is supplied to the conductive plates from a power supply 56. To confine and heat the plasma well, it is desirable to provide a high toroidal magnetic field. This requires extremely large electrical currents through the liquid metal, which is a good electrical conductor. It is difficult to provide such large electrical currents at low impedance efficiently. Furthermore, in order to provide uniformity, it is desirable that the currents be generated in a manner evenly distributed azimuthally around the torus. Specific preferred power supplies 56 for so generating the current are shown in FIGS. 5, 6 and 7.

The power supply illustrated in FIG. 5 is an equatorial homopolar generator 58. A homopolar generator operates on the same principle as a conventional generator of electrical current, namely that when a conductor is moved across a magnetic field, current is generated orthogonally to both the direction of motion and the direction of the magnetic field. The difference is that in a homopolar generator the magnetic field does not vary along the direction of conductor motion. Homopolar generators are characteristically of much lower impedance than conventional generators and produce direct current.

In FIG. 5 the homopolar generator 58 is shown in transverse section through the major axis of the toroidal liner 34. The generator 58 is circularly symmetrical about that axis and is mounted equatorially of the toroidal space 48. The generator 58 includes a homopolar rotor 60 mounted in any convenient fashion for rotation about the major axis of the liner 34. Upper and lower field exciting coils 62 and 64, which are preferably superconductive, are driven by a current supply, not shown, to produce a magnetic field indicated by B flowing transversely of the rotor 60. When the rotor 60 is rotated about its axis (into the plane of the drawing as shown in FIG. 5), direct current is induced in the feed plates 50 and 52, flowing through the plate 50 to and through the liquid metal 32 linking the toroidal space 48, and thence back through the plate 52 to the generator 58. Because the tokamak device and the homopolar generator 58 are circularly symmetrical, the current is evenly distributed azimuthally around the torus, hence producing a uniform toroidal field.

Brushes 66 connect the plates 50 and 52 to the respective poles of the rotor 60. Because the currents are very great, it is desirable to use brushes of particularly good conductivity. Such brushes may be liquid metal brushes, as in the form of pools of mercury. The rotor 60 may be driven in any conventional manner, as through gears. Preferably, however, it is driven by a hydraulic turbine, turbine blades 67 being fastened on the outer surface of the rotor. Alternatively, the rotor 60 may be driven as the rotor of an induction motor by means of the rotating magnetic field of an adjacent stator.

In FIGS. 6 and 7 is shown a related power supply in the form of magnetohydrodynamic (MHD) generator 68 which is much like the homopolar generator but uses flowing liquid metal instead of the rotating solid rotor. In FIG. 6 and MHD generator 68 is shown in section through the major axis of the toroidal liner 34. The generator 68 may be generally circularly symmetrical, like the homopolar generator 58, but it is preferably comprised of a number of separate sections each beginning and ending as shown in FIG. 7. Liquid metal is circulated by a driving means 69 through a conduit or conduits 70 defined by the feed plates 50 and 52 and by insulating wall members 72. The fluid is introduced into the conduits 70 through respective curved inlet conduits 78 and leaves through respective curved outlet conduits 80. The inlet and outlet conduits 78 and 80 are made from electrically insulating materials to reduce eddy current losses. The liquid is conveniently driven by a driving means 69 formed of a high pressure pneumatic accumulator with throttle valves for power modulation for pulsed operation, or by pumps for steady operation. The exciting field is provided by upper and lower exciting coils 74 and 76, just as in the homopolar generator, to produce a radially transverse magnetic field B. Movement of the conductive liquid metal through the conduit or conduits 70 then generates direct current through the feed plate 50, thence through the liquid metal 32 in a path linking the toroidal space 48, and back through the feed plate 52. The result is the same as with the homopolar generator 58.

In operation of the tokamak system of the present invention, plasma is created in the toroidal space 48 by introducing appropriate gas filling therein and applying current in a known manner to the ohmic heating coils 46. This may be in a known back-bias to zero mode. The plasma may then be maintained in position in a known manner by applying appropriate current to the equilibrium field coils 48. The present invention permits the application of very high currents in excess of, for example, $10^7$ A) through the liquid metal 32 around the toroidal space 48 and hence a relatively high toroidal magnetic field so as to confine the plasma. At the same time, because the conductor is liquid, internal stresses are automatically alleviated, being transferred to the pressure vessel 30, which is made of structural material and is preferably spherical for maximum strength.

The power supply 56 must be a low impedance, high power source, preferably providing current to the liquid metal 32 substantially evenly distributed azimuthally around the major axis of the toroidal space.

While preferred embodiments of the invention have been shown and described, various modifications may be made therein within the scope of the invention. For example, the containment vessel 30 may take other shapes. The ohmic heating coils 46 and the equilibrium coils 44 may be disposed differently and may be driven in a number of known ways. The power supply 56 may take other forms. Other materials may be used. As the liquid metal 32 is subject to large magnetohydrodynamic convective cells means, such as baffles, may be used to reduce the size of the cells, when necessary or desirable; however, the poloidal field provides some stabilization and damping.

It should also be noted that details of well-known components of tokamak devices have been omitted from the drawings in order that the essential parts of the invention may be more easily shown and understood.

The present invention provides a relatively high toroidal field with a relatively small overall device. The smaller size of the device may result in lower cost, and the higher field confines the plasma to a smaller volume, increasing the interaction between the plasma particles.

What is claimed is:

1. Tokamak apparatus comprising
a pressure vessel for defining a reservoir and confining liquid therein, said reservoir being circularly symmetrical about a reservoir axis and symmetrical about the midplane of the reservoir normal to said reservoir axis,
a toroidal liner symmetrically disposed within said pressure vessel for defining a toroidal space within said liner, said toroidal space having its major axis substantially coincident with said reservoir axis and its midplane substantially coincident with said reservoir midplane,
liquid metal filling said reservoir outside of and surrounding said liner,
means for passing electric current through said liquid metal over a conductive path linking said toroidal space to produce a toroidal magnetic field within said toroidal space about the major axis thereof for confining a toroidal plasma, said means for passing electric current including a low impedance, high power source providing current substantially evenly distributed azimuthally around the major axis of the toroidal space, said first and second radial electrically conductive members disposed within said reservoir and separated by an electrically insulating member disposed at said reservoir midplane, and
means for developing toroidal plasma within said toroidal space about the major axis thereof.

2. Apparatus according to claim 1 wherein said low impedance, high power source comprises a homopolar generator circularly symmetrical about said major axis and mounted at the midplane of said toroidal space and including a homopolar rotor mounted for rotation about said major axis, and means for producing a magnetic field transversely of said rotor.

3. Apparatus according to claim 1 wherein said low impedance, high power source comprises a magnetohydrodynamic generator.

4. Apparatus according to claim 3 wherein said magnetohydrodynamic generator is comprised of a number of separate sections disposed end-to-end equatorially around said toroidal space.

5. Apparatus according to any one of claims 1 and 2 to 4 wherein said liquid metal is lithium.

6. Apparatus according to any one of claims 1 and 2 to 4 wherein said means for developing a toroidal plasma includes ohmic heating coils carried by said toroidal liner.

7. Apparatus according to claim 6 further including equilibrium field coils carried by said toroidal liner for positioning said toroidal plasma.

* * * * *